United States Patent
Carper et al.

(10) Patent No.: US 10,419,617 B2
(45) Date of Patent: Sep. 17, 2019

(54) INTERACTIVE VOICEMAIL MESSAGE AND RESPONSE TAGGING SYSTEM FOR IMPROVED RESPONSE QUALITY AND INFORMATION RETRIEVAL

(71) Applicant: International Business Machines Corporation, Armonk, NY (US)

(72) Inventors: George P. Carper, Tucson, AZ (US); James E. Damgar, Tucson, AZ (US); Socheat Sou, Tucson, AZ (US); Howard Ruihua Zhao, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 15/240,941

(22) Filed: Aug. 18, 2016

(65) Prior Publication Data
US 2018/0054526 A1    Feb. 22, 2018

(51) Int. Cl.
*H04M 3/533*     (2006.01)

(52) U.S. Cl.
CPC ... *H04M 3/53383* (2013.01); *H04M 3/53341* (2013.01)

(58) Field of Classification Search
CPC .............. H04M 3/53341; H04M 3/53383
USPC .............. 379/67.1–88.28; 455/412.1–420; 704/271–278
See application file for complete search history.

(56) References Cited

U.S. PATENT DOCUMENTS

| | | | | |
|---|---|---|---|---|
| 5,530,950 A | * | 6/1996 | Medan | H04M 3/493 379/67.1 |
| 5,878,423 A | * | 3/1999 | Anderson | G06F 16/907 |
| 6,876,729 B1 | | 4/2005 | Kuter et al. | |
| 8,019,059 B2 | | 9/2011 | Holtzberg | |
| 8,160,883 B2 | * | 4/2012 | Lecoeuche | H04M 1/72561 379/88.01 |
| 8,233,597 B2 | * | 7/2012 | Kerr | H04M 3/53333 379/88.01 |
| 8,654,939 B2 | * | 2/2014 | Kovales | H04M 3/533 379/69 |

(Continued)

FOREIGN PATENT DOCUMENTS

WO    2002051105 A1    6/2002

*Primary Examiner* — Hemant S Patel
(74) *Attorney, Agent, or Firm* — Zilka-Kotab, P.C.

(57) ABSTRACT

Embodiments of the disclosure relate to interactive voicemail tagging of messages and responses to provide improved navigation and tracking of information requested/contained in voicemail messages and responses. Users may tag portions of the recorded message/response to indicate presence of a request for information, an answer providing requested information, etc. and navigate to particular portions of the recorded message/response using the tags. Accordingly, in one embodiment a computer-implemented method for interactive voicemail message and response tagging and processing includes: receiving a prompt having associated therewith one or more prompt tags; receiving a response corresponding to the prompt, the response having associated therewith one or more response tags; and processing the response to determine either or both of a content of the response and a context of the response. Corresponding systems and computer program products are also disclosed.

20 Claims, 3 Drawing Sheets

(56) References Cited

U.S. PATENT DOCUMENTS

2010/0111270 A1\* 5/2010 Langos ................ H04M 3/533
379/88.14

\* cited by examiner

INTERACTIVE VOICEMAIL MESSAGE AND RESPONSE TAGGING SYSTEM FOR IMPROVED RESPONSE QUALITY AND INFORMATION RETRIEVAL

BACKGROUND

The invention relates to voicemail, and more particularly, to systems, products and techniques that facilitate improving a caller's ability to provide complete, accurate information necessary in the context of the call, as well as to facilitate the call recipient's (callee's) ability to retrieve specific information from the voice mail and follow up with the caller to supplement information as needed.

Voicemail is a well-known and frequently used technology for facilitating communications between individuals who may not be simultaneously available for participating in a real-time communication, typically a telephone call. In many contexts, voicemail is a suitable substitute for direct communication between the individuals, especially when the amount of information needing communication is small, e.g. a simple sentence or message less than 15 seconds in length which conveys only high-level information such as the caller's identity and basic reason for calling.

However, in other contexts, especially commercial contexts, the nature of the call may be much more complex, and may require communicating a significant amount of potentially complex information (e.g. alphanumeric strings to identify products, individuals, services, etc.). As such, the voicemail system may include a detailed, lengthy prompt instructing the caller regarding the information that is necessary in the context of the call, followed by a lengthy response by the caller providing such information.

While traditional voicemail systems are perfectly adequate to present and record complex information and allow retrieval of such information at the callee's convenience, it is often difficult for the caller to ensure all needed information is provided (e.g. because the caller may forget some of the instructions while providing the response, may not understand part or all of the prompt, or may not have access to all the information designated by the prompt). Similarly, the callee reviewing the caller's response may not properly or completely obtain all needed information from the response, and/or may need to replay the entire response several times in order to retrieve all needed information included in the response.

Along similar lines, traditional voicemail systems simply present the prompt, and record the response, are therefore rely entirely on the callee and caller to ensure the prompt and response are complete and sufficiently clear to be understood. Traditional voicemail systems are unable to independently determine prompt or response completeness.

Accordingly, it would be beneficial to provide systems and techniques that facilitate callers understanding the information necessary in the context of a particular call, providing all such information in a voicemail response, and independently validating completeness of the voicemail response. It would be of further benefit to facilitate callee retrieval of information from the caller's response without requiring the callee repetitively listen to the entire response.

SUMMARY

In one embodiment, a computer-implemented method for interactive voicemail message and response tagging and processing includes: receiving a prompt having associated therewith one or more prompt tags; receiving a response corresponding to the prompt, the response having associated therewith one or more response tags; and processing the response to determine either or both of a content of the response and a context of the response.

In another embodiment, a computer program product for interactive voicemail message and response tagging and processing includes a computer readable storage medium having program instructions embodied therewith. The computer readable storage medium is not a transitory signal per se, and the program instructions are executable by a processor to cause the processor to perform a method. The method includes: receiving, at the processor, a prompt having associated therewith one or more prompt tags; receiving, at the processor, a response corresponding to the prompt, the response having associated therewith one or more response tags; and processing, by the processor, the response to determine either or both of a content of the response and a context of the response.

In yet another embodiment, an interactive voicemail message and response tagging and processing system includes: a processor; and logic integrated with and/or executable by the processor. The logic is configured, upon execution thereof, to cause the system to: receive a prompt having associated therewith one or more prompt tags; receive a response corresponding to the prompt, the response having associated therewith one or more response tags; and process the response to determine either or both of a content of the response and a context of the response.

Other aspects and embodiments of the present invention will become apparent from the following detailed description, which, when taken in conjunction with the drawings, illustrate by way of example the principles of the invention.

DETAILED DESCRIPTION

Figure 1:
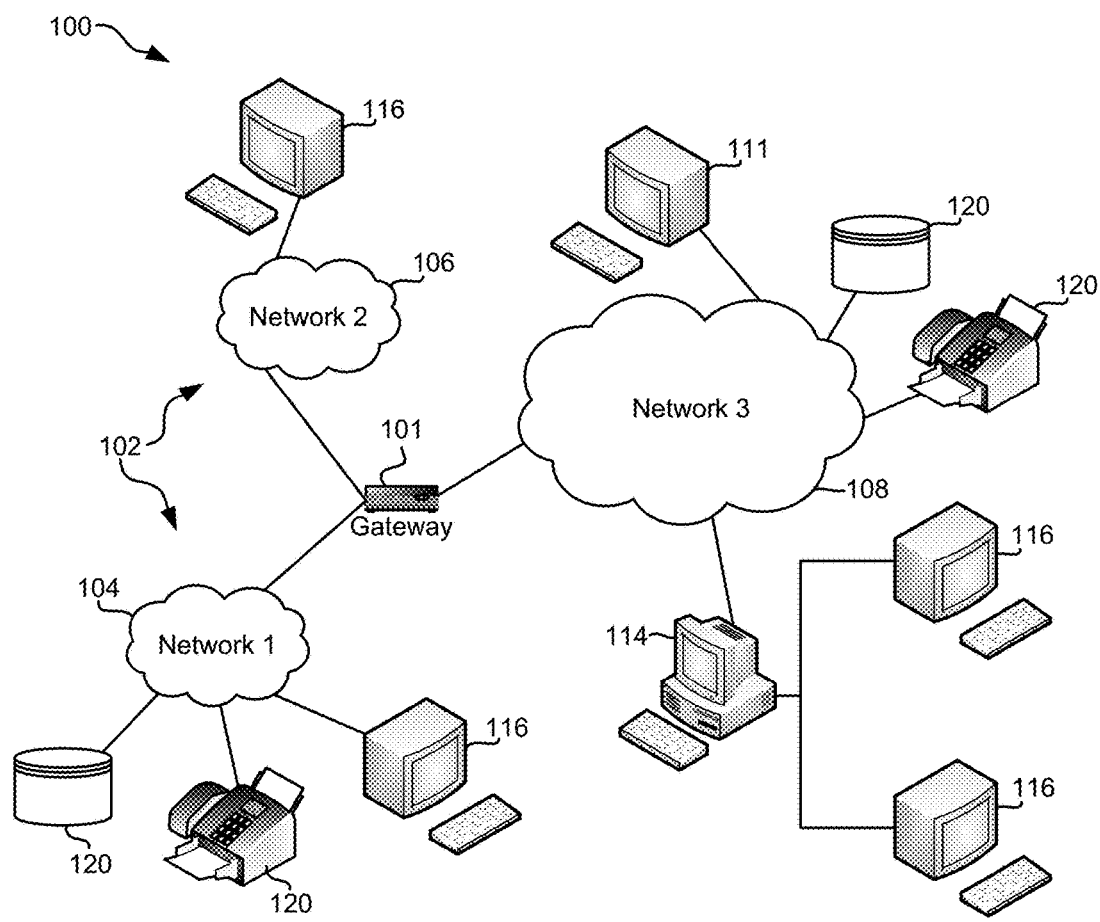
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products facilitating interactive voicemail message and response tagging for improved response quality and information retrieval.

As referenced herein, "voicemail" should be understood as including any type of automated or semi-automated system for providing instructions to a caller and/or recording information provided by the caller for subsequent retrieval and/or review. In most embodiments, voicemail should be understood to include systems in which a prerecorded message is displayed to the caller (whether in auditory, visual, or other format) and the caller is provided an opportunity to record a response following the message.

In commercial contexts, a caller calling a commercial enterprise may be prompted with an automated guide, e.g. a pre-recorded set of instructions, to facilitate the caller receiving the desired service and/or being directed to the proper callee. The caller may be instructed by the automated guide to provide certain information prior to being directed to the proper callee. Such systems should also be understood as within the scope of "voicemail" as described herein.

As noted above, while traditional voicemail systems are suitable for providing instructions to a caller and recording the caller's response, such systems suffer limitations in certain contexts, e.g. commercial contexts, due to an inability to ensure a caller fully understands and complies with instructions included in the voicemail prompt and further inability for the callee to selectively retrieve portions of the caller's response, e.g. portions conveying a particular item of information among a plurality of items of information included in the response as a whole.

Certain improvements to traditional voicemail systems attempt to address the inefficiencies noted above by, e.g. allowing a callee to navigate through a caller's response using "fast-forward" and "rewind" functions. Such approaches allow the callee to navigate through the response, and may therefore alleviate the need for the callee to repeat an entire response in order to retrieve particular information therefrom. However, these approaches do not address the problems associated with a caller failing to provide necessary information since the navigation functions are only available to the callee.

In addition, as will be appreciated by any individual having attempted to locate a particular portion of a message, song, video, etc. fast-forward and rewind functionalities are imprecise and locating the particular portion of the message, song, video, etc. is in practice a difficult and time-consuming task. In some instances it may be more efficient to simply replay the entire response rather than attempt to navigate to a particular portion thereof.

In other voicemail systems, the caller may be provided an opportunity to review the prompt provided by the voicemail system prior to recording a response. While such solutions allow the caller to repeat the prompt, these solutions exacerbate rather than alleviate the inefficiencies associated with lengthy, complex prompts and associated difficulty or failure by the caller to provide a complete response. For instance, even after repeating a prompt, a caller may still omit certain information in the provided response, or may still lack sufficient understanding to provide appropriate information in the response.

Further still, some existing solutions enable the callee to bookmark portions of a response while reviewing the response, and optionally navigate to bookmarked portions thereafter. While such solutions allow the caller to repeat portions of the prompt, the caller still must review the entire response to apply the bookmarks, and is likely to focus entirely on bookmarking during the first review since it is difficult to both extract the necessary information from the response and designate the appropriate bookmark in close temporal proximity. Therefore the bookmarking approaches add to the amount of time and effort needed to retrieve the necessary information from the response. Furthermore, since the callee is the only party capable of applying bookmarks, and only to the response, these bookmarking solutions do not address problems associated with callers providing incomplete or inaccurate responses.

In addition, none of the foregoing improvements to conventional voicemail systems enable independent validation of response completeness. By "independent validation," the present disclosure should be understood to refer to validating responses using systems, techniques, and/or individuals that do not involve input from the caller and/or callee.

Accordingly, the presently disclosed inventive interactive voicemail message and response tagging systems, techniques, and computer program products address the shortcomings of existing voicemail technology by providing the capability for both caller and callee to respectively apply tags to the response and prompt, while also enabling independent validation of response completeness and/or accuracy based at least in part on the tags, and/or analyzing content of the prompt and/or response.

In one general embodiment, a computer-implemented method for interactive voicemail message and response tagging and processing includes: receiving a prompt having associated therewith one or more prompt tags; receiving a response corresponding to the prompt, the response having associated therewith one or more response tags; and processing the response to determine either or both of a content of the response and a context of the response.

In another general embodiment, a computer program product for interactive voicemail message and response tagging and processing includes a computer readable storage medium having program instructions embodied therewith. The computer readable storage medium is not a transitory signal per se, and the program instructions are executable by a processor to cause the processor to perform a method. The method includes: receiving, at the processor, a prompt having associated therewith one or more prompt tags; receiving, at the processor, a response corresponding to the prompt, the response having associated therewith one or more response tags; and processing, by the processor, the response to determine either or both of a content of the response and a context of the response.

In yet another embodiment, an interactive voicemail message and response tagging and processing system includes: a processor; and logic integrated with and/or executable by the processor. The logic is configured, upon execution thereof, to cause the system to: receive a prompt having associated therewith one or more prompt tags; receive a response corresponding to the prompt, the response having associated therewith one or more response tags; and process the response to determine either or both of a content of the response and a context of the response.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
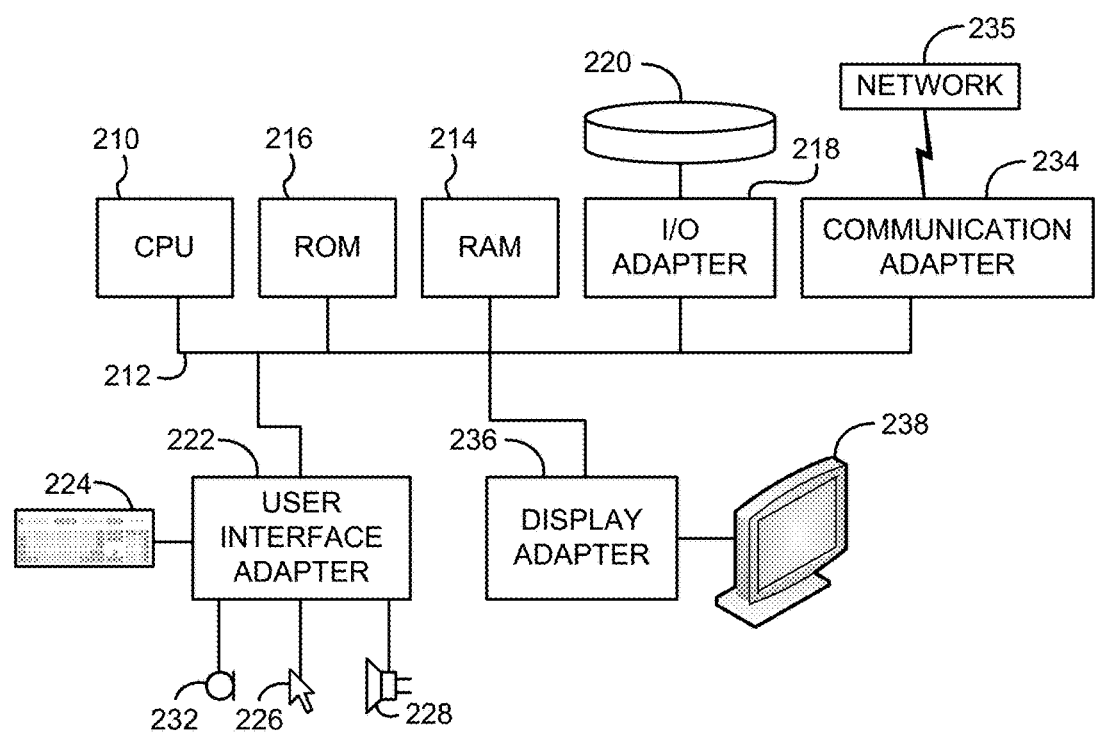
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
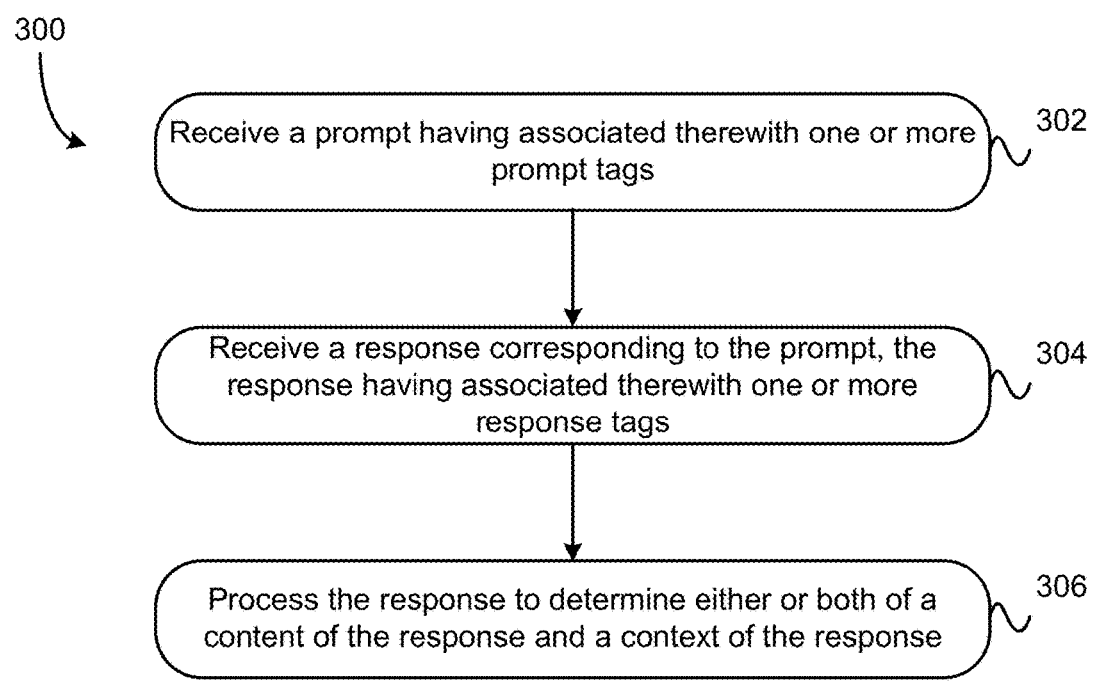
FIG. 3 is a flowchart of a method for interactive voicemail message and response tagging and processing, according to one embodiment.

Now referring to FIG. 3, a flowchart of a method 300 is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a telecommunications device such as a touchtone telephone, mobile telephone, smartphone, tablet, etc., and/or a server environment serving one or more telecommunications devices, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 3, method 300 may initiate with operation 302, where a prompt having associated therewith one or more prompt tags, e.g. tags of the type described hereinabove, is received. The prompt may be received at or via a communications device such as a telephone, smartphone, tablet, microphone coupled to a workstation, etc. such as shown in FIGS. 1 and 2, and/or may be received at or via a telecommunications network, e.g. at a server environment serving one or more telecommunications devices, such as shown in FIGS. 1 and 2.

In operation 304 of method 300, a response corresponding to the prompt is received. The response also has associated therewith one or more response tags, e.g. tags of the type described herein, and may be received in any suitable manner such as those described above regarding receiving the prompt.

Method 300 also includes operation 306, in which the response is processed to determine either or both of a content of the response and a context of the response. Processing the response (and similarly, processing the prompt as may be performed in conjunction with processing the response) may include analyzing the response itself, and/or the response tags associated with the response. Preferably processing includes analyzing at least the response tags with reference to the prompt tags, in one embodiment.

As understood herein, content may include any suitable analysis or processing of the subject matter of the response, e.g. parsing audio content to extract therefrom text for comparison to the prompt, parsing metadata associated with the prompt to determine the number of tags associated with the response, comparing the tags associated with the response with tags associated with the prompt, etc. as would be appreciated by a skilled artisan upon reading the present disclosures. Determining context of the prompt may be understood as including similar parsing as for determining content, but with a different objective—e.g. determining whether a response is urgent and/or includes supplemental information, responsive questions for the callee, etc. Accordingly, determining context may be based in part on determining whether the response tags include tags of a particular type, a predetermined number of tags of a particular type, etc. in various embodiments.

Method 300 includes the foregoing operations according to the embodiment shown in FIG. 3. Skilled artisans reading the present descriptions will also appreciate that the method 300 may additionally or alternatively involve any number of other operations, features, components, etc. as disclosed herein. The additional/alternative operations, features, components, etc. may be included or substituted in any combination, permutation, etc. without departing from the scope of the present descriptions. For instance, in different, combinable embodiments, method 300 may include one or more of the following.

In one embodiment, the prompt tags and the response tags may each independently include one or more tag types selected from: timestamp, question, answer, supplemental information, critical, and contact information tag types. As described in further detail below, the tag types may facilitate higher level processing of voicemail prompts and responses, and greatly improve the function of voicemail systems by enabling more facile understanding of prompt requirements/instructions, as well as ensuring completeness of responses.

Preferably, processing the response to determine either or both of the content of the response and the context of the response includes mapping one or more of the prompt tags to one or more of the response tags. The mapping may be based in whole or in part on the tag type and/or tag number (e.g. sequential position of the tag within a set of tags having the same tag type). Generally speaking, mapping the tags includes determining whether a 1:1 correspondence exists between the prompt tags and the response tags, in particularly preferred approaches.

In more embodiments determining the content of the response comprises determining whether the response is complete, e.g. based the mapping indicating whether a 1:1 correspondence exists. A response may be considered complete, in various approaches, when all question tags associated with the prompt have a corresponding answer tag associated with the response, when all required question tags associated with the prompt have a corresponding answer tag associated with the response, or when all tags associated with the response have a corresponding tag (optionally of the same type) associated with the response. In more approaches, a user may define a threshold level of completeness (e.g. a minimum threshold, a minimum percentage, etc.) to be present for a message content to be considered "complete."

In some approaches, in response to determining the response is not complete, method 300 may include generating or retrieving an additional prompt indicating the response is not complete. Optionally and preferably the additional prompt (described elsewhere herein as a "summary" in some embodiments) indicates which portions of the prompt were not addressed in the response so as to facilitate completion of the response with a supplemental response. In such embodiments, method 300 may also include transmitting (in the case of a server, for example) or displaying (in the case of a telecommunications device, such as a smartphone, for example) the additional prompt to a user; and receiving an additional response from the user in response to transmitting or displaying the additional prompt.

Method 300 may optionally include prioritizing the response based at least in part on the content of the response, e.g. prioritizing the response based at least in part on whether the response is complete, the degree to which the response is complete, etc. Prioritization may additionally or alternatively be based on context of the response, e.g. based on the response including one or more tags of a particular type such as question tags, supplemental information tags, critical tags, etc. Since the type of tag(s) present may indicate a manner in which a response is incomplete, prioritization may be based on the particular context of how the response is incomplete, e.g. missing answers to critical questions, missing answers to required or optional questions, etc.

In more approaches, determining the context of the response may include determining the response is associated with one or more particular tag types, particularly critical tag types, question tag types, supplemental information tag types, and/or contact information tag types. In response to determining the context of the response, the method 300 may include routing the response based at least in part on the context of the response; and/or prioritizing the response based at least in part on the context of the response. For instance, responses including a critical tag may be routed to a manager, alternate recipient such as an on-call expert, etc. Responses including particular contact information tags may be routed to an appropriate department or individual, responses including question tag types may be routed to a human recipient, e.g. in the case of an automated voicemail recipient handling incoming calls, etc.

The prompt tags may be associated with the prompt in response to a user providing tag indicators via a communications device; and the response tags may be associated with the response in response to a second user providing tag indicators via a second communications device, in various embodiments. For example, the tag indicators may include input selected from tactile input provided via either or both of the communications device and the second communications device; and auditory input provided via either or both of the communications device and the second communications device. Thus, users may indicate tags by interacting with the communications device by pressing one or more keys on the communications device, and/or by speaking key phrases to indicate presence of a tag in association with the response. The tags may be associated with the prompt and/or response as metadata, e.g. where the prompt and/or response comprise audio data, the tags may include metadata identifying the tag type, tag sequential position, and/or a timestamp within the audio data to which the tag corresponds.

Preferably, each of the tag indicators indicates at least a type of the corresponding tag, and more preferably each of the tag indicators uniquely identifies one of the prompt tags or one of the response tags.

In various embodiments, the presently disclosed inventive interactive voicemail tagging systems, techniques, and/or computer program products may include any of the following features, structures, operations, etc. without departing from the scope of the instant descriptions. Moreover, such features, structures, operations, etc. may be combined in any suitable manner.

In one aspect of the presently disclosed inventive concepts, the party expecting to receive calls and voicemails (typically the callee, but optionally another user besides the individual who will review the caller's responses) is preferably enabled to associate tags with a prompt that will be presented to callers seeking to communicate with the party expecting to receive calls.

The party/callee may input information into the voicemail system to associate the tags with the prompt, and in various embodiments the input may be provided in different forms. For instance if the prompt is an audible message, the party/callee may record the audible message and simultaneously or subsequently provide indicators to the voicemail system that certain portions of the recording should be tagged. Simultaneous recording and provision of tag indicators may include a callee speaking audible message content comprising the prompt so the voicemail system may record the audible message content, and while speaking provide the indicator(s) at appropriate times throughout recording the audible message content.

Additionally and/or alternatively, subsequent provision of tag indicators may involve the callee recording a first portion of the prompt, e.g. a generic greeting, introduction, and/or summary of the information the caller should provide in response to the prompt. For instance, the first portion of the prompt may identify the entity the caller has reached, hours of operation, contact information for the entity, etc. and may indicate a number of questions/requests that will be presented to the caller. The callee may subsequently input tag indicators to the voicemail system and record additional portions of the prompt after providing each tag indicator, e.g. speaking the questions or requests for specific items of information, optionally with a more detailed description of each particular item of information, following input of a tag indicator. Multiple tags and additional portions of the prompt may be input in a sequential manner until the prompt is complete.

The callee associating tags with the prompt advantageously allows callers to navigate the prompt interactively, facilitating callers' ability to review each portion of the prompt and ensure the caller understands the information that should be included in the response. Further, the caller need not repeat the entire prompt, but may navigate to specific portions according to the caller's requirements. Further still, by associating specific tag types with the prompt, the callee may enable the voicemail system to perform higher level processing such as determining a number of questions/requests included in a prompt, analyzing corresponding responses to determine completeness thereof, designating certain portions of the prompt as "critical" and therefore disallowing callers to skip over critical portions, etc. as described elsewhere herein and/or as would be understood by a person having ordinary skill in the art upon reading the present disclosures. Tag types and techniques for associating different types of tags with prompts and responses will be discussed in further detail below.

Turning now to the caller, in preferred approaches the caller is able to utilize tags associated with the prompt, as noted above, as well as associate tags with the response to the prompt. In a similar manner as described above regarding the callee, the caller may record a response and simultaneously or subsequently provide tag indicators so as to associate tags with the response. The tags may also similarly allow the callee to navigate through the caller's response, e.g. navigating to portions that include answers/items of information corresponding to a portion of the prompt asking the corresponding question and/or requesting the item of information.

In various embodiments, tags associated with the prompt and/or response may further indicate the context of each portion of the prompt/response, e.g. timestamp tags for navigation throughout the prompt/response; answer tags to indicate portions of a response that correspond to a question or request in the prompt (and optionally indicate the particular question or request to which the portion is responsive); question tags to (preferably uniquely) indicate portions of the prompt and/or response that present a question or request for information; critical tags to indicate portions of the response that the caller or callee should be required to review at least once; supplemental information tags that indicate portions of the response which provide answers or items of information, but which are not necessarily provided in response to a question or request in the prompts, contact information tags to indicate contact information that may be used to reach the caller or callee, etc. as would be understood by persons having ordinary skill in the art upon reading the instant descriptions.

In some embodiments, question tags may be distinguished further according to whether the respondent may, or must, provide an answer to the corresponding question, e.g. "optional question" versus "required question" tags. In preferred approaches, each of the foregoing tag types conveys navigation capability in addition to the functionality stated above.

Associating tags with the prompt and/or response may be accomplished in any suitable manner, and in several preferred embodiments may include the caller or callee providing input directly via the communications device being used to record the prompt or response. In various embodiments, directly provided input may include the user inputting different keystrokes or combinations of keystrokes to indicate to the voicemail system that a tag should be associated with a particular portion of the prompt/response, and/or the type of tag to be associated with each portion of the prompt/response.

For instance, in one illustrative approach, while recording the message the caller or callee could use the "0", "*", and "#" key to provide tag type indicators, e.g. marking the beginning of a timestamp tag, question tag, and answer tag, respectively. Of course, other keys may be configured to indicate the various tag types, and may vary depending on the nature of the keypad or other input interface of the communications device (e.g. a virtual keyboard for mobile communications devices).

In more sophisticated versions of the foregoing illustrative approach, the caller or callee could input a combination of one of the foregoing tag type indicators and a sequence indicator, e.g. indicating the sequential number of the particular tag type in the prompt/response. For example, a caller or callee could input one of the foregoing tag type indicators followed by a numerical value, e.g. a value in a range from 1-9, to indicate the tag type and sequential position of that tag type with respect to other tags of the same type that are also associated with the prompt/response. The input may be provided in the form of tactile input, e.g. a user pressing certain keys on a keypad of a communications device, or auditory input, e.g. spoken tags provided with the response or prompt.

In this manner, individual tags of each type may be uniquely designated facilitating even more sophisticated navigation of the prompt/response by the caller and/or callee, as well as sophisticated and/or processing of the prompt/response by the voicemail system. For instance, the voicemail system may analyze tags associated with a prompt, and tags associated with a corresponding response, and determine not only the degree to which the response is complete, but also the specific portions of the prompt for which a corresponding answer or item of information was not provided in the response. Such embodiments improve the parties' ability to easily determine whether additional follow up is needed, and if so specifically what information should be gathered in the follow up action.

An even more sophisticated, but also more user friendly system, may use voice recognition as a mechanism to associate tags with prompts/responses. Users may provide audio tags simultaneously or sequentially to providing the content of the response. For instance, the user may speak a tag phrase such as "Question 1", and "Answer 1" and the voice mail system would automatically create the proper tags and associate the proper tags with the proper portion(s) of the prompt/response.

In terms of the tags being indicated to the listener, various implementations are possible within the scope of the presently disclosed inventive concepts. While not to be considered limiting on the manner in which tags may be indicated to the listener, suitable implementations may include a simple audio tone being played at the beginning of each bookmark, optionally with different tones indicating different tag types. Tags may be indicated to a listener via a pause in the playback of the recorded prompt/response, optionally having a tone or voice overlay indicating the tag type and/or sequential position of the tag (e.g. question 1, answer 4, supplemental information 2, critical portion 1, etc.), followed by the content of the question, answer, etc.

Optionally, and as mentioned above, at the beginning and/or end of the prompt or response, a summary of the prompt or response may be presented to the caller or callee. The summary may preferably include a number of some or all of the various types of tags associated with the prompt, e.g. in the form of an instruction such as "this prompt includes four questions, please provide and tag four answers in your response," "the caller has asked a question in addition to providing answers to the prompt questions," "the caller has designated answer two and question one as critical portions of the response," etc.

As a further advantage, higher level processing of voicemail prompt and/or response content is possible using the presently disclosed inventive concepts. For instance, an automated system serving the voicemail technology may review prompts and/or responses (individually or as associated pairs, in various embodiments) to determine content and/or context of the prompt and/or response and provide a summary to the listener. The summary may be provided automatically in response to determining the content and/or context of the request, in some approaches. In other approaches the summary may be provided upon request, e.g. a summary of the number of questions/items of information included in the prompt, a summary of the number of answers/items of information included in the response, a degree of response completeness, presence of questions/answers/items of information included in a response that do not correspond to a question or request for information in the prompt, etc. as would be understood by a person having ordinary skill in the art upon reading the present descriptions.

The summary may be generated using similar processing and analysis as part of the higher level processing functionality enabled via the present descriptions. Generating a summary may optionally include identifying tags associated with responses or prompts, and/or mapping tags associated with a response to tags associated with a corresponding prompt. For instance if a prompt includes four question tags but a corresponding response includes three or five answer tags, the voicemail system may determine the response is incomplete, or includes supplemental information, respectively. If the tags of a particular type are uniquely identified, e.g. via sequence information, the system may determine the specific question from the prompt which lacks a corresponding answer in the response, and report the specific question(s) that are unanswered.

Preferred embodiments leverage the summary information to facilitate receiving complete responses without requiring follow up by the callee. For instance, a caller provides an incomplete response. The voicemail system may process the provided incomplete response, and determine the response lacks one or more tags corresponding to e.g. one or more question tags associated with the prompt, preferably determine the specific tag associated with the prompt lacks a corresponding tag associated with the response. In response to determining the response lacks the tag(s), the voicemail system may display another prompt to the user specifically indicating that the response is incomplete, and optionally but preferably specifying the particular questions/requests in the prompt that are not answered in the response. The caller may then be prompted to record a new response, or simply provide a supplemental response supplying the missing information.

In certain embodiments, higher level processing such as mentioned above also enables the voicemail system to take proactive action to facilitate rapid review of responses in appropriate circumstances. For instance, in one embodiment responses determined to include a question or critical information (optionally a critical question, i.e. a portion having both critical and question tag types associated therewith) may be routed automatically by the voicemail system, e.g. to another suitable recipient.

This routing capability is particularly advantageous in certain contexts, such as communications regarding medical information where a patient caller may have an emergency, but the patient's primary physician (pharmacist, therapist, etc.) is not available to take the call. Rather than waiting for the primary physician to review the patient's voicemail, the system may automatically route the message to an alternative physician (e.g. on-call physician) for urgent review. Again, the routing may preferably be based on determining the caller's response is associated with certain tag type(s), optionally in combination with determining a certain amount of time has elapsed since the caller recorded the response.

Such higher level processing also enables prioritization of responses within the voicemail system/environment. For instance, responses may be prioritized according to degree of completeness, so that a user of the voicemail system may quickly and easily determine whether, and if so which of the responses require follow up inquiries (e.g. partial responses), may be processed with minimal effort (e.g. complete responses), include additional information (e.g. responses with more tags than a number of tags associated with the corresponding prompt), include an inquiry directed to the callee (e.g. responses with more tags than a number of tags associated with the corresponding prompt, and/or tags of a type not corresponding to tags associated with the corresponding prompt), etc. as would be understood by skilled artisans upon reviewing the instant disclosures. Of course, the callee or other user of the voicemail system may choose an appropriate set of criteria such as those listed above or equivalents thereof according to which responses should be prioritized. The callee or other user may define such a prioritization to the voicemail system, and the system may preferably implement the prioritization to rank each response received according to the defined criteria.

As such, the voicemail systems and techniques described herein may utilize a backend system such as a VoIP server environment, or be embodied as software and/or firmware which may be integrated directly with the communications device (especially for smartphones, tablets, etc.) to enable the comparison of tags associated with prompts and corresponding responses; determining completeness of responses or other characteristics of responses such as presence of supplemental information, questions, critical information, etc.; associating tags with recorded audio data and other functionality that would be understood as suitable for implementation in a computing environment as opposed to a traditional touchtone telephone.

The foregoing functionality, in various embodiments, conveys significant advantages to the presently disclosed inventive voicemail solutions relative to existing voicemail systems and techniques. Generally speaking, enabling each party to tag respective sides of the communication (e.g. callee to tag prompt, caller to tag response) enables independent validation of response completeness, e.g. by mapping tags between the prompt and response.

The presently disclosed inventive concepts enable a caller to selectively navigate to particular portions of the prompt, while also allowing the callee to selectively navigate to particular portions of the response. This selective navigation allows each party to review select portions of the prompt/response without having to navigate using imprecise tools such as fast forward or rewind, and also without requiring the listener (for the prompt, caller and for the response, callee) to create the tags.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method for interactive voicemail message and response tagging and processing, the method comprising:
    receiving a prompt having associated therewith one or more prompt tags;
    receiving a response corresponding to the prompt, the response having associated therewith one or more response tags;
    processing the response to determine a content of the response; and
    prioritizing the response based at least in part on the content of the response.

2. The method as recited in claim 1, wherein the prompt tags and the response tags each independently include one or more tag types selected from a group consisting of: timestamp, question, answer, supplemental information, critical, and contact information.

3. The method as recited in claim 1, wherein processing the response to determine the content of the response comprises mapping one or more of the prompt tags to one or more of the response tags.

4. The method as recited in claim 1, wherein determining the content of the response comprises determining whether the response is complete.

5. The method as recited in claim 4, comprising, in response to determining the response is not complete, generating or retrieving an additional prompt indicating the response is not complete.

6. The method as recited in claim 5, comprising:
    transmitting or displaying the additional prompt to a user; and
    receiving an additional response from the user in response to transmitting or displaying the additional prompt.

7. The method as recited in claim 1, comprising determining a context of the response, wherein determining the context of the response comprises determining the response is associated with one or more particular tag types.

8. The method as recited in claim 7, comprising routing the response based at least in part on the context of the response.

9. The method as recited in claim 7, comprising prioritizing the response based at least in part on the context of the response.

10. The method as recited in claim 1, wherein the prompt tags are associated with the prompt in response to a user providing tag indicators via a communications device; and
    wherein the response tags are associated with the response in response to a second user providing tag indicators via a second communications device.

11. The method as recited in claim 10, wherein the tag indicators comprise input selected from a group consisting of:
    tactile input provided via either or both of the communications device and the second communications device; and
    auditory input provided via either or both of the communications device and the second communications device.

12. The method as recited in claim 10, wherein each of the tag indicators indicates at least a type of one of the prompt tags or one of the response tags.

13. The method as recited in claim 10, wherein each of the tag indicators uniquely identifies one of the prompt tags or one of the response tags.

14. The method as recited in claim 1, wherein each of the prompt and the response comprise audio data;
    wherein the prompt tags comprise metadata associated with the audio data of the prompt; and
    wherein the response tags comprise metadata associated with the audio data of the response.

15. A computer program product for interactive voicemail message and response tagging and processing, the computer program product comprising a computer readable storage medium having program instructions embodied therewith, wherein the computer readable storage medium is not a transitory signal per se, the program instructions executable by a processor to cause the processor to perform a method comprising:

receiving, at the processor, a prompt having associated therewith one or more prompt tags;

receiving, at the processor, a response corresponding to the prompt, the response having associated therewith one or more response tags;

processing, by the processor, the response to determine a context of the response, wherein determining the context of the response comprises determining, by the processor, the response is associated with one or more particular tag types; and prioritizing, by the processor, the response based at least in part on the context of the response.

16. An interactive voicemail message and response tagging and processing system, comprising:

a processor; and logic integrated with and/or executable by the processor, wherein the logic is configured, upon execution thereof, to cause the system to:

receive a prompt having associated therewith one or more prompt tags;

receive a response corresponding to the prompt, the response having associated therewith one or more response tags;

process the response to determine either or both of a content of the response and a context of the response; and prioritize the response based at least in part on the determined either or both of the content of the response and the context of the response.

17. The system as recited in claim 16, wherein the prompt tags and the response tags each independently include one or more tag types selected from a group consisting of: timestamp, question, answer, supplemental information, critical, and contact information.

18. The system as recited in claim 16, wherein processing the response to determine either or both of the content of the response and the context of the response comprises mapping one or more of the prompt tags to one or more of the response tags.

19. The system as recited in claim 16, wherein determining the content of the response comprises determining whether the response is complete; and wherein determining the context of the response comprises determining the response is associated with one or more particular tag types.

20. The system as recited in claim 16, wherein the response is prioritized based at least in part on the content of the response.

* * * * *